Feb. 17, 1931.  J. A. RIVINGTON  1,792,607
DIVIDER FOR MOWING MACHINES
Filed July 26, 1928  2 Sheets-Sheet 1
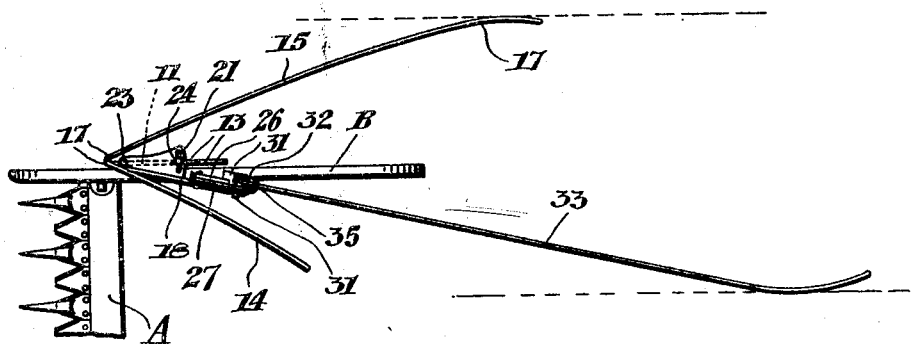
INVENTOR
JOHN A. RIVINGTON

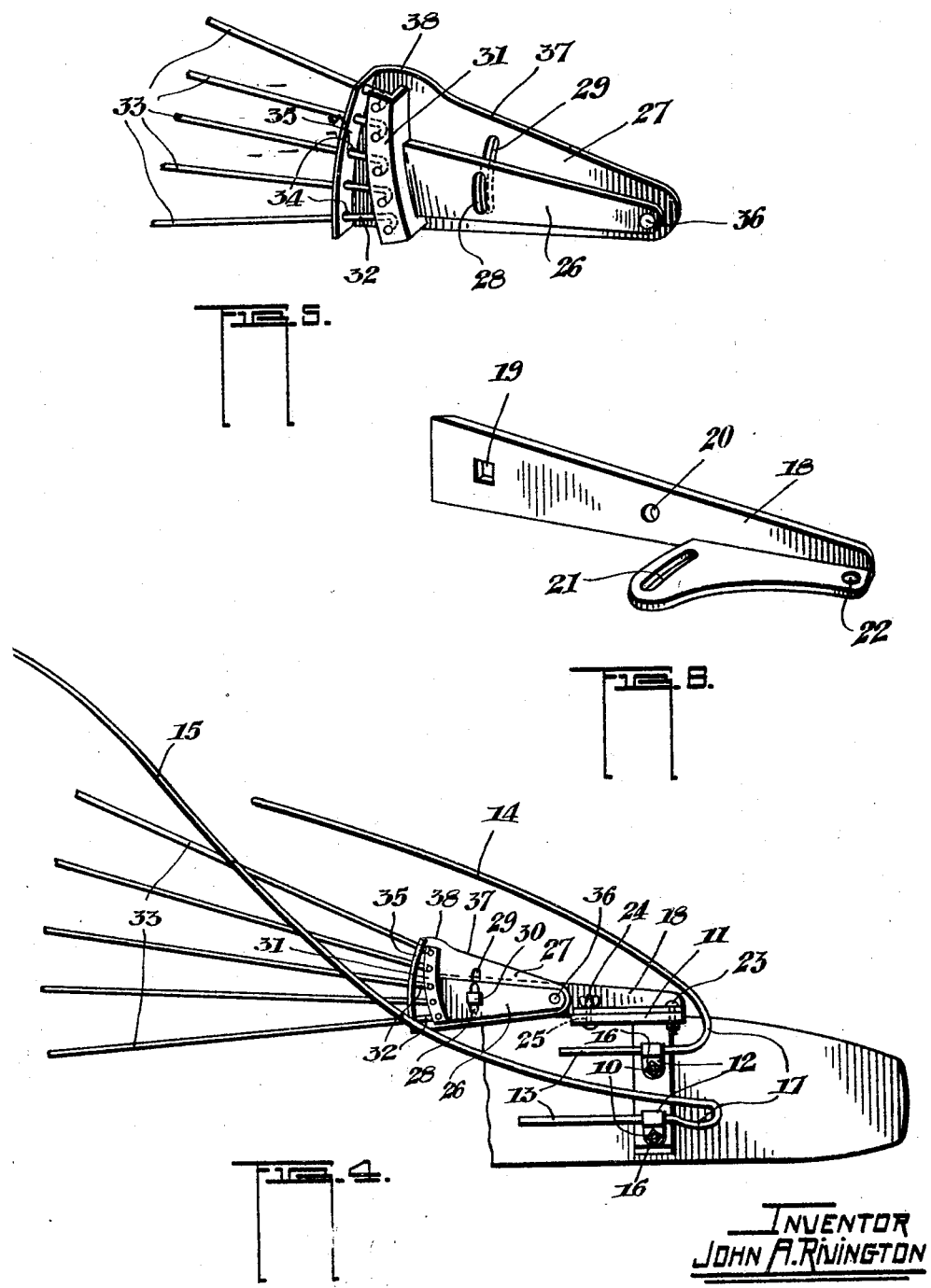

Patented Feb. 17, 1931

1,792,607

UNITED STATES PATENT OFFICE

JOHN ANDREW RIVINGTON, OF CARP, ONTARIO, CANADA

DIVIDER FOR MOWING MACHINES

Application filed July 26, 1928. Serial No. 295,542.

This invention relates to improvements in dividers for mowing machines and more particularly to an attachment for the ordinary divider or tracker board associated with the cutting bar of a mowing machine.

One object of the invention is to provide simply constructed and durable means associated with the tracker board for separating, removing, pushing out, and depositing the cut swath of a crop such as hay, alfalfa, grain or the like as it falls behind the cutter bar when the mowing machine moves forward in operation, thus leaving a parallel clearance or passageway of predetermined width between the standing crop and the removed swath for each successive round and in such manner that the mowing machine and the inner shoe and cutter bar thereof will not come in contact with the swath in its next round or with successive swaths in subsequent rounds. By thus providing that the swath is cut clear of the mower and well set up good ventilation by sun and air is assured and bunching, trailing and clogging are also eliminated.

With the ordinary divider arm much time and labour is practically wasted when cutting a thickly lodged crop as the swath is left lying too close to the standing crop thereby hampering the mowing machine and choking the knife. To overcome this it has heretofore been the practice to clear the heel of the cutter bar by manual labour, using hand forks or the like and following after the mowing machine. With my attachment, however, all this is avoided and a clear passage of any required width is automatically provided allowing the inner shoe, heel, or guards of the cutter bar to work freely.

The novel features of the invention consist in the combination with the divider or tracker board of a mowing machine, of a pivotally mounted adjustable divider head provided with adjustable arms adapted under all crop conditions to engage with the swath to provide a continuous uniform clearance or passageway of predetermined area parallel with the standing crop. With the foregoing may also be provided an adjustable tucker rod and a guard rod for assisting the swath to pass freely backwards.

Reference is now had to the accompanying drawings in which an example of my invention is disclosed and in which like numerals of reference indicate corresponding parts in each figure.

Figure 1 is a side elevation of the divider head with divider arms or prongs fitted to the divider or tracker board of a mowing machine.

Figure 2 is a top plan view.

Figure 3 is a detail view of one of the divider arms or prongs.

Figure 4 is an enlarged side view of the outer side of the tracker or divider board fitted with my attachment.

Figure 5 is a perspective view of the divider head and divider arms detached from the tracker board.

Figure 6 is a perspective detail of the divider shank.

Referring now more particularly to the drawings, A designates the cutter bar of an ordinary mowing machine and B the divider or tracker board of well known construction associated therewith. Rigidly secured on the outside of the divider board by means of bolts 10 is a sill or crosshead 11. Associated with this sill and at right angles thereto are spaced clamps 12 adapted to adjustably support the bent ends 13 of a guard rod 14 and a tucker rod 15, holding them securely in any position and for the various adjustments upwardly and downwardly or inwardly and outwardly by means of the nuts 16. Either or both these rods may be attached or detached when desired.

The tucker rod 15 is curved or bent as at 17 to permit, when adjusted, variations in its relationship to the guard rod 14. Mounted on the sill or cross-head 11 is the divider shank 18 (see Figure 6) provided with openings or holes 19 and 20 and an adjusting slot 21. The head of this shank is also provided with an orifice 22 adapted to register with an orifice in the sill 11 and to engage with a pin or bolt 23 thereby providing a pivotal mounting for the shank and permitting it to turn sufficiently to be adjustable through the slot 21 engaging with a bolt 24 or the like in the orifice 25 of the sill.

Pivotally mounted on the divider shank 18 through the hole 20 is the divider head C comprising the sections 26 and 27 in which are the slots 28 and 29 registering with one another and adapted to engage with any suitable retaining means 30. In the curved or arcuate ends 31 of the section 26 are anchored the bent ends 32 of a plurality of rods or prongs 33 which extend through a series of oblong orifices 34 in the turned-in end 35 of the section 27, these orifices 34 providing sufficient clearance for the prongs 33 passing therethrough to permit a vertical movement of section 26 relatively to the section 27, and also a pivotal movement as well as a vertical movement of section 27 and also a pivotal movement of both sections collectively or separately through the pivotal mounting 36 engaging with the orifice 20 in the divider shank 18.

It will be noted that the slot 29 in the section 27 is preferably of greater length than the slot 28 in the section 26 to permit wider adjustment to suit the condition of the swath to be removed. The holes or orifices 34 are preferably spaced uniformly and formed oblong to provide sufficient clearance for the prongs 33 passing therethrough to move freely within said orifices without binding and permit vertical movement of the cross head 31 relatively to the portion 35 with a consequent vertical movement of the prongs 33. The top edge 37 of the section 27 of the divider head C is raised as at 38 to permit a swath to pass without coming in contact with the cross-head 31.

The section 26 is provided with a curved or arcuate end or cross-head 31, similar to the portion 35 of the section 27, but so arranged as to be off centre from 36 and to permit the lower ends of the portions 31 and 35 to be spaced somewhat wider than at the top, causing the lower arms to move slower.

In operation the divider prongs 33 being first adjusted according to the state of the crop and the condition of the swath to be removed, the width of the passageway is regulated by adjusting the divider shank 18 through the screw or bolt 24. The tucker rod 15 is then adjusted through the clamp 12 to permit it to tuck or turn back into the standing crop any overhanging portions while the guard rod 14 is also similarly adjusted to prevent the swath from falling over the front of the tracker board. The machine is then moved forward in the operation of cutting and as it does so a continuous parallel clearance or passageway of predetermined width is automatically provided between the deposited swath and the standing crop, the arms or prongs 33 being adjusted to suit existing conditions by means of the nut 30 engaging with the slots 28 and 29 in the head sections 26 and 27.

As many changes could be made in the above construction and many apparently widely different embodiments of my invention, within the scope of the claims, constructed without departing from the spirit or scope thereof, it is intended that all matter contained in the accompanying specification and drawings shall be interpreted as illustrative and not in a limiting sense.

What I claim as my invention is:—

1. An attachment for mowing machines comprising in combination with the tracker board, a pivotally mounted shank member thereon, a divider pivotally mounted on the shank, a plurality of prongs pivotally mounted in the divider, and means for adjusting the shank, the divider, and the prongs.

2. A divider attachment for mowing machines associated with the tracker board and comprising a pivotally mounted and horizontally movable shank member, a divider head pivotally mounted and vertically adjustable on the shank member, and a plurality of arms in the head.

3. The device according to claim 2 in which the head member is formed of co-operating sections having a common pivotal point, a plurality of prongs in one of the sections adapted to loosely engage with the other section.

4. The device according to claim 2 in which the divider head is formed of a pair of co-operating sections pivotally connected at one end and provided adjacent the other end with slots whereby said sections are vertically adjustable.

5. The device as claimed in claim 2 in which suitably bent tucker and guard rods are adjustably mounted on the tracker board in co-operating relationship with the divider head.

6. In a mowing machine the combination with the tracker board and a divider mounted thereon to have both pivotal and slidable movement relative thereto, of a plurality of arms associated with the divider to have both pivotal and vertical movement relative thereto.

7. In a mowing machine the combination with the tracker board and a divider mounted thereon to have both pivotal and slidable movement relative thereto, of a plurality of arms associated with the divider to have both pivotal and vertical movement relative thereto, and means for selectively or collectively adjusting the divider and said arms.

8. In a mowing machine the combination with the tracker board provided with adjustable guard and tucker rods, and a divider mounted thereon, of a plurality of arms associated with the divider to have both pivotal and vertical movement relative thereto, and means for selectively or collectively adjusting the divider and said arms.

9. In a mowing machine, the combination with the tracker board, of a horizontally swingable shank member extending rearwardly of the machine, a divider head carried by the shank member in vertically swingable relation thereto and formed of two commonly pivoted sections relatively movable to one another, a plurality of rearwardly extending arms carried by the head movable therewith and relatively thereto, and a guard arm and tucker arm adjustably carried on the tracker board extending rearwardly of the machine and on each side of the shank member and arms.

10. The device as claimed in claim 9 in which the sections of the divider head comprise two relatively movable abutting members formed with transversely extending arcuate slots having a pin therethrough, a flange member formed on one end of one of the sections provided with substantially oblong orifices therein, a cross-head formed on the corresponding end of the other section provided with orifices adapted to receive the ends of the arms, said arms protruding through the orifices in the flange of the first section and extending rearwardly of the machine.

11. A device as claimed in claim 9 in which the shank member comprises a rearwardly extending member extending in a vertical plane in normal position and formed with a projecting bearing surface extending in a horizontal plane in normal position, said bearing surface being formed with an orifice in one end, an arcuate slot in the opposite end adapted to receive a pivoting bolt, and an adjusting bolt for adjustably connecting the shank member to a mounting device on the tracker board.

In witness whereof I have hereunto set my hand.

JOHN ANDREW RIVINGTON.